United States Patent

[11] 3,611,129

| | | |
|---|---|---|
| [72] | Inventor | Jiri Simurda<br>Brno, Czechoslovakia |
| [21] | Appl. No. | 795,475 |
| [22] | Filed | Jan. 31, 1969 |
| [45] | Patented | Oct. 5, 1971 |
| [73] | Assignee | Vyzkumny ustav zdravotnicke techniky<br>Brno, Czechoslovakia |

[54] LOW FREQUENCY MEASURING CIRCUIT
10 Claims, 1 Drawing Fig.

[52] U.S. Cl. .................................................. 324/78 I,
307/295, 328/140
[51] Int. Cl. ................................................. G01r 23/02
[50] Field of Search ........................................... 324/70, 78;
307/233, 295; 328/140

[56] References Cited
UNITED STATES PATENTS
3,350,637  10/1967  Pochtar ........................  324/78

Primary Examiner—Michael J. Lynch
Attorney—Richard Low

ABSTRACT: An amplifier is coupled to the filter and connected to the frequency-measuring indicator of a frequency meter. A coupling circuit couples the filter to the amplifier. The amplifier is a transistor and has a current amplification factor which is highly dependent upon the instantaneous working point of the amplifier whereby the equivalent effect of the filter and the amplifier is a function of the direct current component output of the filter, and the filter and amplifier function as a filter with an automatically controlled filtering effect.

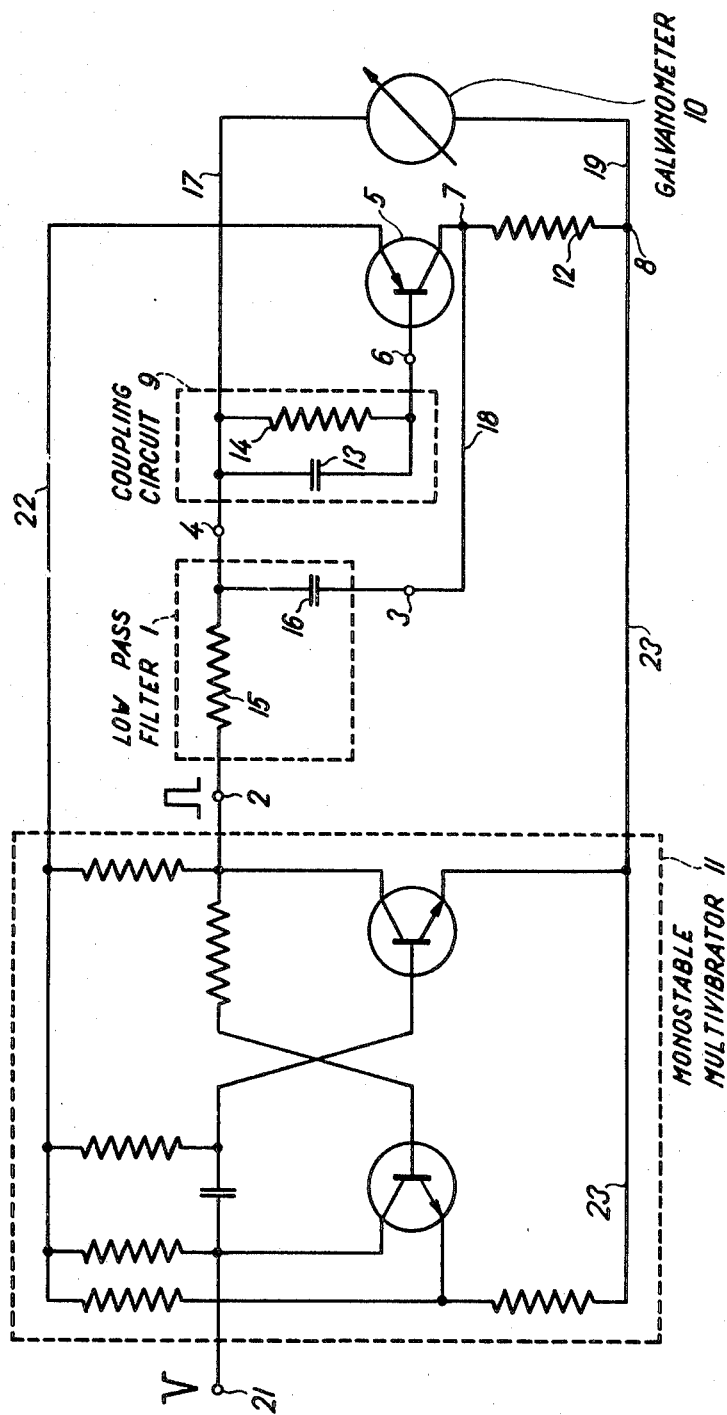

LOW FREQUENCY MEASURING CIRCUIT

DESCRIPTION OF THE INVENTION

The present invention relates to a frequency-metering circuit arrangement and more particularly to a circuit arrangement for measuring low frequencies of less than approximately 200 cycles per minute, such as the frequencies of the human heartbeat.

Known cardiotachometers utilize a simple or composite RC filter circuit. The heartbeat to be measured is converted to a sequence of electrical pulses of fixed magnitude and duration. The pulses are supplied to a filter which filters them and supplied the filtered pulses to a meter such as a galvanometer. Thus, only the DC components of the pulses supplied to the filter are supplied to the galvanometer. The DC components of the pulses are proportional to the frequency, rapidity or rate of the heartbeat.

A difficulty of the known cardiotachometer is that the DC components supplied to the galvanometer have a residual ripple which result from inadequate filtering. The indicator or needle of the galvanometer thus oscillates about the value corresponding to the actual heartbeat at a frequency corresponding to the rhythm of the heart, when the heart rate or frequency is constant. The accuracy of the measurement results of the cardiotachometer is adversely affected by the oscillations of the galvanometer needle.

The amplitude of the oscillations of the galvanometer needle may be decreased by increasing the time constant of the RC filter. However, the time constant of the RC filter may be increased to a limited extent only, if at all, since such variations of the time constant tends to eliminate, obscure or make indistinct the effects of such slow variations of the DC components resulting from variations in the frequency of the heartbeat. The period during which the measured heartbeat frequency is averaged is lengthened so that rapid variations in such frequency cannot be detected by the equipment. Furthermore, the time which elapses between the commencement of operation of the cardiotachometer and the first useful indication of the galvanometer is extended. The extended time for the movement of the galvanometer needle from zero to a measured indication is a great disadvantage when the frequency of the heartbeats of a number of patients is to be determined in successive measurements.

It is necessary that a compromise be reached in known cardiotachometers between the maximum possible accuracy and the maintaining of the galvanometer needle steady, even at unusually low frequencies, although the amplitude of the ripple oscillations normally increases as the frequency of the heartbeats decreases.

The principle object of the present invention is to provide a new and improved frequency-metering circuit arrangement.

One object of the present invention is to provide a new and improved cardiotachometer.

Another object of the invention is to provide a frequency meter circuit which overcomes the disadvantages of known frequency meter circuits. Still another object of my invention is to provide a cardiotachometer which overcomes the disadvantages of known cardiotachometers.

A further object of this invention is to provide a frequency meter circuit which functions to indicate frequency with accuracy, efficiency effectiveness and reliability.

One more object of the present invention is to provide a cardiotachometer which functions to indicate the frequency of a heartbeat with accuracy, efficiency, effectiveness and reliability.

In accordance with the present invention, a frequency-metering circuit arrangement comprises input means for providing a sequence of pulses of uniform amplitude and uniform duration at a low frequency. A filter is connected to the input means for converting the pulses provided by the input means to a substantially direct current component proportional to the frequency of the input pulses. The direct current component has a residual ripple. Frequency-measuring means connected to the filter indicates the magnitude of the direct current component as an indication of the frequency of the input pulses. An amplifier is coupled to the filter and connected to the frequency-measuring means. Coupling means connects the filter to the amplifier. The amplifier has a current amplification factor which is highly dependent upon the instantaneous working point of the amplifier whereby the equivalent effect of the filter and the amplifier is a function of the direct current component, and the filter and amplifier function as a filter with an automatically controlled filtering effect.

The filter comprises a low-pass filter and the filter and amplifier function as a low-pass filter.

The working point of the amplifier is controlled by the direct current component via the coupling means in a manner whereby the amplifier functions as an amplifier throughout the entire range of frequencies to be measured.

The amplifier amplifies and inverts the residual ripple of the direct current component and combines the inverted amplified ripple with the ripple of the direct current component to increase the filtering action of the filter.

The amplification factor of the amplifier increases and the filtering effect of the filter and amplifier increases as the measured frequency decreases.

The coupling means comprises a resistor and a capacitor connected in parallel with each other. The amplifier comprises a transistor having emitter, collector and base electrodes. The filter has input means and an output and the amplifier comprises a transistor having a collector electrode connected in common to one terminal of the frequency-measuring means, a point in the input means and an input of the filter, an emitter electrode connected to another point in the input means, and a base electrode coupled to the output of the filter via the coupling means. The output of the filter is directly connected to the other terminal of the frequency-measuring means. A load resistor is connected between the collector electrode of the transistor and a point in common connection with the one terminal of the frequency-measuring means and the point in the input means. The amplification factor of the transistor increases with an increase in magnitude of the direct current component. The coupling means comprises a resistor and a capacitor connected in parallel with each other. The filter comprises a resistor and a capacitor connected to each other.

In order that the present invention may be readily carried into effect, it will now be described with reference to the accompanying drawing, wherein the single FIGURE is a circuit diagram of an embodiment of the frequency-metering circuit arrangement of the present invention.

In the FIGURE, an input signal generator 11 comprises any suitable input signal generator known in the art such as, for example, a monostable multivibrator of known type. The multivibrator 11 is powered via line 22 to the positive terminal and via connection 23 to the negative terminal of a known power source, and is coupled to one terminal of a galvanometer 10 via a low-pass filter 1, a coupling circuit 9 and a lead 17. The multivibrator 11 is coupled to the other terminal of the galvanometer 10 via the filter 1, a lead 18, a load resistor 12 and a lead 19.

Input signals are supplied to the monostable multivibrator 11 from a suitable source such as, for example, a microphone adjacent the heart of a patient, via an input terminal 21. The input signals are sharp electrical signals, and are converted by the monostable multivibrator 11 to square or rectangular pulses of uniform amplitude and duration. The monostable multivibrator 11 operates in a known manner to shape the pulses, as described. The rectangular or square wave pulses are provided at a terminal 2 which is the output terminal of the multivibrator 11 and the input terminal of the filter 1. The average value of the square pulses during a fixed period of time is proportional to the frequency of the heartbeat and is determined by the circuit.

The filter 1 has an input terminal 3, as well as the input terminal 2, and an output terminal 4 which is directly connected to the galvanometer 10 via the lead 17. The lead 18 connects the input terminals 3 of the filter 1 to a common point 7 in the series connection between the load resistor 12 and the collector electrode of a transistor 5. The emitter electrode of the transistor 5 is connected to the multivibrator 11 via a lead 22. The load resistor 12 is connected to the galvanometer 10 via the lead 19 and a circuit point 8. The monostable multivibrator 11 is connected to the circuit point 8 and the lead 19 via a lead 23.

The base electrode of the transistor 5 is connected to the coupling circuit 9 via a terminal 6, which functions as the output terminal of said coupling circuit and the input terminal of said transistor. The coupling circuit 9 thus couples the output of the filter 1 to the input of the transistor 5. The filter 1 is an RC filter comprising a resistor 15 and a capacitor 16. The coupling circuit 9 comprises a capacitor 13 and a resistor 14 connected in parallel with each other.

The transistor 5 functions as an amplifier. When the working point or operating point of the transistor 5 is outside its operating range, said transistor does not function as an amplifier and the filtering effect of the filter 1 is predominant. The time constant of the filter 1 is so selected that the filtering effect of said filter only is so small that the needle of the galvanometer 10 rapidly attains a stable position which indicates the measured frequency. The aforedescribed residual ripple would thus cause the galvanometer needle to oscillate about its frequency indication at an undesirable amplitude.

The operating or working point of the transistor 5 is controlled by the output signal of the filter 1, however, particularly the aforedescribed DC component, via the coupling circuit 9, in a manner whereby said transistor functions as an amplifier throughout the entire range of frequencies to be measured. The transistor 5 amplifies and inverts the residual ripple, so that the amplified ripple is combined with the output signal of the filter 1 in phase opposition. This creates the effect of a reinforced filtering action or an equivalent increase in the time constant.

If the transistor 5 is selected with a current amplification factor which is highly dependent upon the instantaneous working point of said transistor, the equivalent effect of the filter system comprising the filter 1 and said transistor is a function of the DC component of the measured signal. The equivalent effect of the filter system 1,5 is thus a function of the frequency of the heartbeat, and the filtering effect increases as the measured frequency decreases. The filter system 1,5 thus functions as a low-pass filter with an automatically controlled filtering effect.

The amplitude of the direct current ripple supplied to the galvanometer 10 may be made fully independent of the measured frequency by suitable selection of the resistance value of the resistor 14 and the capacity of the capacitance 13 of the coupling circuit 9. When there is an abrupt variation in the measured frequency, as when the galvanometer 10 initially indicates a zero frequency at the commencement of a measurement, the abrupt variation in potential is transmitted directly by the capacitor 13 of the coupling circuit 9 to the base electrode of the transistor 5, so that when there is a variation of sufficient magnitude said transistor is switched in its conductive condition.

As hereinbefore described, the filter 1 has little effect under the foregoing conditions, so that the needle or indicator of the galvanometer 10 very rapidly approaches a stable value until the current supplied to the transistor 5 reaches a steady magnitude, said transistor operates as an amplifier, and the magnitude of the ripple in the output signal of said transistor reaches the desired magnitude.

The connection of the transistor 5 in the frequency-measuring circuit, in accordance with the present invention, does not adversely affect the accuracy of the measurements, as indicated by the galvanometer 10. The measurement indications provided by the galvanometer 10 are not affected by the effects of heat and time on the transistor 5, since variations in the DC component of the collector current of said transistor do not affect the indications provided by said galvanometer.

Although the frequency-metering circuit arrangement of the present invention has been described with reference to a cardiotachometer, for illustrative purposes, it is not so limited, but has a great variety of applications as a pulse-rate-measuring circuit for low-frequency pulses.

While the invention has been described by means of a specific example and in a specific embodiment, we do not wish to be limited thereto, for obvious modifications will occur to those skilled in the art without departing from the spirit and scope of the invention.

What is claimed is:

1. A frequency-metering circuit arrangement comprising
    pulse input means for providing a sequence of uniform area current pulses of uniform amplitude and uniform duration at a low frequency indicative of the frequency to be measured;
    filter means having a first input connected to said pulse input means for converting the pulses provided by said pulse input means to a substantially direct current component proportional to the frequency of the input pulses, said direct current component having a residual ripple, said filter means having a second input and an output;
    frequency-measuring means connected to the output of said filter means for indicating the magnitude of said direct current component as an indication of the frequency of the input pulses;
    amplifier means having an input and an output, said output being coupled to the second input of said filter means and to said frequency measuring means; and
    coupling means connecting the output of said filter means to the input of said amplifier means, said amplifier means having a current amplification factor which is highly dependent upon the instantaneous working point of said amplifier means whereby the equivalent effect of said filter means and said amplifier means is a function of said direct component, and said filter means and amplifier means function as a filter with an automatically controlled filtering effect.

2. A frequency-metering circuit arrangement as claimed in claim 1, wherein said filter means comprises a low-pass filter and said filter means and amplifier means function as a low-pass filter.

3. A frequency-metering circuit arrangement as claimed in claim 1, wherein the working point of said amplifier means is controlled by said direct current component via said coupling means in a manner whereby said amplifier means functions as an amplifier throughout the entire range of frequencies to be measured.

4. A frequency-metering circuit arrangement as claimed in claim 1, wherein said amplifier means amplifies and inverts the residual ripple of said direct current component and combines the inverted amplified ripple with the ripple of said direct current component to increase the filtering action of said filter means.

5. A frequency-metering circuit arrangement as claimed in claim 1, wherein the amplification factor of said amplifier means increases and the filtering effect of said filter means and amplifier means increases as the measured frequency decreases.

6. A frequency-metering circuit arrangement as claimed in claim 1, wherein said coupling means comprises a resistor and a capacitor connected in parallel with each other.

7. A frequency-metering circuit arrangement as claimed in claim 1, wherein said amplifier means comprises a transistor having emitter, collector and base electrodes.

8. A frequency meter circuit arrangement as claimed in claim 1 wherein said amplifier means comprises a transistor having a collector electrode connected in common to one terminal of said frequency-measuring means, and said pulse input means, an emitter electrode connected to said pulse input means, and a base electrode coupled to the output of said filter means via said coupling means.

9. A frequency-metering circuit arrangement as claimed in claim 8, wherein said filter means has an input and an output said input being connected to said collector electrode the output of said filter means being directly connected to the other terminal of said frequency-measuring means, and further comprising a load resistor connected between the collector electrode of said transistor and the common connection with said one terminal of said frequency-measuring means and said pulse input means.

10. A frequency meter circuit arrangement as claimed in claim 9, wherein the amplification factor of said transistor increases with an increase in magnitude of said direct current component, said coupling means comprises a resistor and a capacitor connected in parallel with each other, and said filter means comprises a resistor and a capacitor connected to each other.